United States Patent
Yamagishi

(10) Patent No.: US 7,810,118 B2
(45) Date of Patent: Oct. 5, 2010

(54) DIGITAL BROADCAST RECEIVING APPARATUS AND METHOD OF DISPLAYING VIDEO DATA IN ELECTRONIC PROGRAM GUIDE WITH DATA LENGTH DEPENDING ON TV PROGRAM DURATION

(75) Inventor: Toru Yamagishi, Yokohama (JP)

(73) Assignee: Victor Company of Japan, Ltd., Kanagawa-Ken (JP)

(*) Notice: Subject to any disclaimer, the term of this patent is extended or adjusted under 35 U.S.C. 154(b) by 487 days.

(21) Appl. No.: 11/900,556

(22) Filed: Sep. 12, 2007

(65) Prior Publication Data
US 2008/0178220 A1 Jul. 24, 2008

(30) Foreign Application Priority Data

Sep. 15, 2006 (JP) ............................. 2006-250882
Jun. 11, 2007 (JP) ............................. 2007-154210

(51) Int. Cl.
*G06F 3/00* (2006.01)
*G06T 11/00* (2006.01)
*G09G 5/00* (2006.01)
*G06F 3/048* (2006.01)

(52) U.S. Cl. ...................... 725/41; 345/472; 345/625; 345/669; 345/684; 715/800

(58) Field of Classification Search .................. 725/41; 345/472, 625, 669, 684; 715/800
See application file for complete search history.

(56) References Cited

U.S. PATENT DOCUMENTS

| 7,568,212 | B2* | 7/2009 | Tsubouchi | 725/38 |
| 7,624,413 | B2* | 11/2009 | Tsubouchi | 725/57 |
| 7,634,789 | B2* | 12/2009 | Gerba et al. | 725/44 |
| 2002/0126203 | A1* | 9/2002 | Yu et al. | 348/61 |
| 2002/0138834 | A1* | 9/2002 | Gerba et al. | 725/42 |
| 2006/0282852 | A1* | 12/2006 | Purpura et al. | 725/39 |

FOREIGN PATENT DOCUMENTS

| JP | 09-037172 | * | 2/1997 | |
| JP | 2001-285744 | | 10/2001 | 5/445 |
| JP | 2002-290864 | | 10/2002 | 5/445 |

* cited by examiner

*Primary Examiner*—Hoang-Vu A Nguyen-Ba
(74) *Attorney, Agent, or Firm*—Renner, Kenner, Greive, Bobak, Taylor & Weber

(57) ABSTRACT

A digital broadcast receiving apparatus has a receiver to receive electronic program guide (EPG) data containing video data and character data associated with TV programs and a display controller to process the EPG data to display an EPG with at least the character data on a screen, displaying of the video data being depending on duration of each TV program. The display controller controls displaying such that only the character data is displayed for TV programs having duration shorter than a predetermined time whereas both of the character data and the video data are displayed for TV programs having duration equal to or longer than the predetermined time by adjusting a size of the video data in a direction of height or width in the EPG as an integer multiple of a size of the character data.

9 Claims, 12 Drawing Sheets

| VIDEO DATA HEIGHT IN DOTS | ASPECT RATIO ( W : H ) | |
|---|---|---|
| | 4:3 | 16:9 |
| 32 | 48(W) × 32(H)DOTS | 57(W) × 32(H)DOTS |
| 48 | 64(W) × 48(H)DOTS | 86(W) × 48(H)DOTS |
| 64 | 86(W) × 64(H)DOTS | 114(W) × 64(H)DOTS |
| 80 | 107(W) × 80(H)DOTS | 143(W) × 80(H)DOTS |
| ⋮ | ⋮ | ⋮ |

FIG. 6

| VIDEO DATA WIDTH IN DOTS | ASPECT RATIO ( W : H ) | |
|---|---|---|
| | 4:3 | 16:9 |
| 48 | 48(W) × 36(H)DOTS | 48(W) × 27(H)DOTS |
| 64 | 64(W) × 48(H)DOTS | 64(W) × 36(H)DOTS |
| 80 | 80(W) × 60(H)DOTS | 80(W) × 45(H)DOTS |
| 96 | 96(W) × 72(H)DOTS | 96(W) × 54(H)DOTS |
| ⋮ | ⋮ | ⋮ |

FIG. 7

DIGITAL BROADCAST RECEIVING APPARATUS AND METHOD OF DISPLAYING VIDEO DATA IN ELECTRONIC PROGRAM GUIDE WITH DATA LENGTH DEPENDING ON TV PROGRAM DURATION

CROSS-REFERENCE TO RELATED APPLICATIONS

This application is based on and claims the benefit of priority from the prior Japanese Patent Application Nos. 2006-250882 filed on Sep. 15, 2006 and 2007-154210 filed on Jun. 11, 2007, the entire contents of which is incorporated herein by reference.

BACKGROUND OF THE INVENTION

The present invention relates to a digital broadcast receiving apparatus that receives data on an electronic program guide (EPG) for explaining the contents of TV programs with at least character data and displaying the EPG and a method of displaying video data associated the TV programs in the EPG.

There are several known methods of displaying EPGs. One is to display only character data associated with TV programs. Another is to display program icons instead of character data so that even children who do not understand the character data can easily select TV programs. Still another is to display video data associated with TV programs which are often selected by a user so that he or she can easily discriminate his or her favorite TV programs from other programs in an EPG.

There are, however, several disadvantages to the EPG displaying methods described above.

A known method of displaying only character data associated with TV programs tends to have much character data to explain the contents of the TV programs, so that users cannot understand the contents easily. A known method of displaying program icons instead of character data could offer child-friendly EPGs which, however, has a limit to explain the contents with icons, so that adults may have a difficulty in understanding the icons. A known method of displaying video data associated with user-favorite TV programs just offers images in an EPG irrespective of the size of the EPG or characters displayed with the images, thus lowering viewability.

Moreover, video data has a larger amount of data than character data. Therefore, as the number of TV programs with which the video data is associated increases, the storage capacity of a memory that stores EPG data increases. In addition, when an EPG is scrolled, even though the EPG has no enough space for displaying video data and the video data cannot be displayed anymore after scrolled, the video data remains in the memory, which is a waste of memory.

SUMMARY OF THE INVENTION

A purpose of the present invention is to provide a digital broadcast receiving apparatus and a method of displaying video data associated with TV programs in an EPG, with higher viewability. Video data includes still picture image data and/or moving picture data in the present invention.

Another purpose of the present invention is to provide a digital broadcast receiving apparatus and a method of displaying video data associated with TV programs in an EPG, using an EPG-data memory of less storage capacity.

The present invention provides a digital broadcast receiving apparatus comprising: a receiver to receive electronic program guide (EPG) data containing video data and character data associated with TV programs; a memory to temporary store the EPG data received by the receiver; and a display controller to control displaying of an EPG with the EPG data by adjusting a size of the video data in a direction of height or width in the EPG as an integer multiple of a size of the character data, for each TV program, based on the EPG data stored in the memory.

Moreover, the present invention provides a digital broadcast receiving apparatus comprising: a receiver to receive electronic program guide (EPG) data containing character data and optionally video data associated with TV programs; a memory to temporary store the EPG data received by the receiver; and a display controller to control displaying of an EPG with the EPG data such that, based on the EPG data stored in the memory, the display controller determines, per TV program, whether the video data is contained in the EPG data in addition to the character data and controls the EPG displaying so that the character data is only displayed when it is determined that the video data is not contained in the EPG data whereas, when it is determined that the video data is contained in the EPG data, the display controller determines whether a specific size of a minimum video-data displaying zone remains in an EPG-data displaying area in the EPG for each TV program after displaying the character data in the EPG-data displaying area per TV program and controls the EPG displaying so that the character data is only displayed when it is determined that the minimum video-data displaying zone does not remain whereas, when it is determined that the minimum video-data displaying zone remains, the display controller controls the EPG displaying so that the video data is displayed in the minimum video-data displaying zone, in addition to displaying the character data in the EPG-data displaying area.

Furthermore, the present invention provides a method of displaying electronic program guide (EPG) data on a screen, the EPG data containing character data and optionally video data associated with TV programs, comprising the steps of: receiving the EPG data and temporary storing the EPG data in a memory; determining whether the EPG data contains the video data in addition to the character data for each TV program based on the EPG data stored in the memory; displaying an EPG with only the character data on the screen for each TV program when it is determined that the EPG data does not contain the video data; when it is determined that the EPG data contains the video data, determining whether a specific size of a minimum video-data displaying zone remains in an EPG-data displaying area in the EPG for each TV program after displaying the character data in the EPG-data displaying area per TV program; displaying only the character data in the EPG when it is determined that the minimum video-data displaying zone does not remain; and displaying the video data in the minimum video-data displaying zone in addition to displaying the character data in the EPG-data displaying area when it is determined that the minimum video-data displaying zone remains.

Moreover, the present invention provides a method of displaying electronic program guide (EPG) data on a screen, the EPG data containing character data and video data associated with TV programs, comprising the steps of: receiving the EPG data and temporary storing the EPG data in a memory; scrolling the EPG on the screen at a fixed scrolling time interval based on the EPG data stored in the memory; and while scrolling, determining whether a displaying width in the EPG in a direction of scrolling is smaller than a reference value per TV program and erasing the video data from the memory for a specific TV program or specific TV programs when it is determined that the displaying width in the EPG in the direction of scrolling is smaller than the reference value for the specific TV program or TV programs.

BRIEF DESCRIPTION OF DRAWINGS

FIG. 6 shows several examples of the size of video data in width (W) and height (H), at a specific number of dots for video data in height that is an integer (2 or more) multiple of 16×16 dots for one character at the screen aspect ratios of 4:3 and 16:9 in width to height;

FIG. 7 shows several examples of the size of video data in width (W) and height (H), at a specific number of dots for video data in width that is an integer (2 or more) multiple of 16×16 dots for one character at the screen aspect ratios of 4:3 and 16:9 in width to height;

DETAILED DESCRIPTION OF PREFERRED EMBODIMENTS

Figure 1:
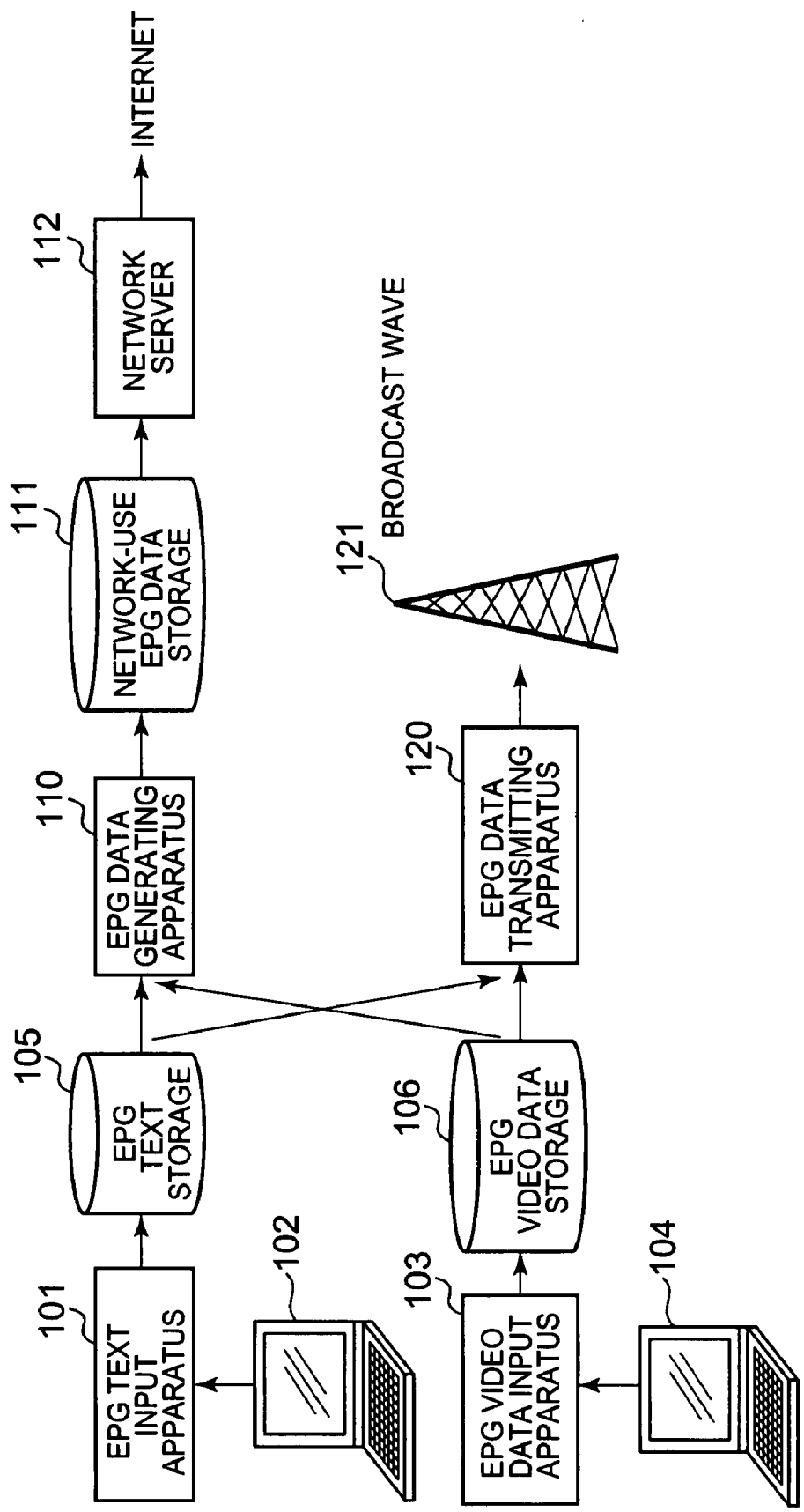
FIG. 1 shows a block diagram of a transmission system that transmits data of the electronic program guide (EPG) to a digital broadcast receiving apparatus according to the present invention.

FIG. 1 shows a block diagram of a transmission system that transmits data of an electronic program guide (EPG) to a digital broadcast receiving apparatus according to the present invention. The electronic program guide and its data are referred to as EPG and EPG data, respectively, hereinafter. EPG data contains character (text) data and video (image) data associated with TV programs. Video (image) data includes still picture data and/or moving picture data.

The transmission system includes an EPG text input apparatus 101, an EPG text input terminal 102, an EPG video data input apparatus 103, an EPG video data input terminal 104, an EPG text storage 105, an EPG video data storage 106, an EPG data generating apparatus 110, a network-use EPG data storage 111, a network server 112, and an EPG data transmitting apparatus 120.

The transmission system has two EPG data transmission channels: one for transmitting EPG data via the Internet 113; and the other for transmitting EPG data with a broadcast wave 121. The system may, however, have either one of the transmission channels.

Embodiment 1

Figure 2:
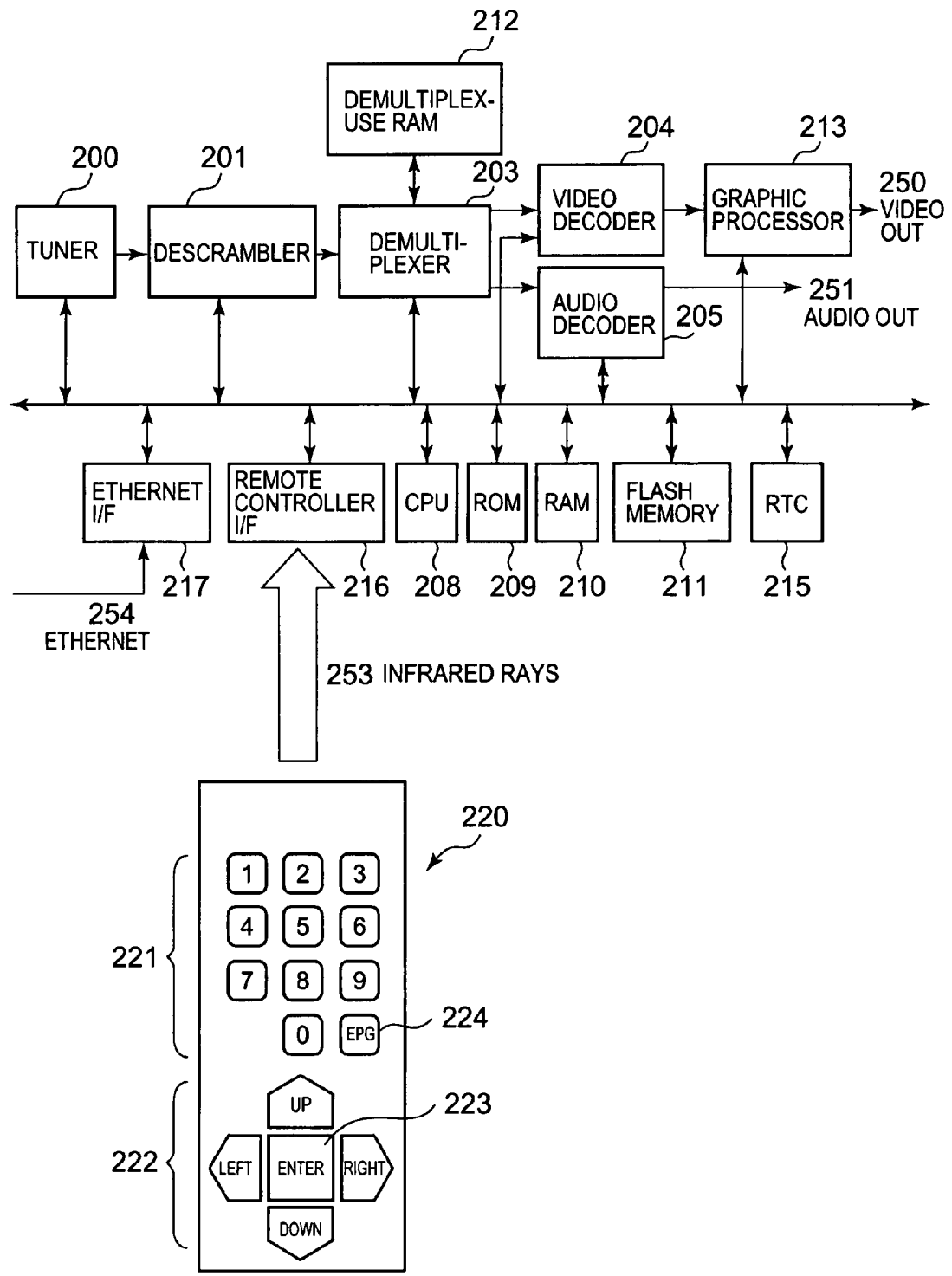
FIG. 2 shows a block diagram of an embodiment of a digital broadcast receiving apparatus according to the present invention.

FIG. 2 shows a block diagram of an embodiment of a digital broadcast receiving apparatus according to the present invention.

The digital broadcast receiving apparatus includes a tuner 201, a descrambler 202, a demultiplexer 203, a video decoder 204, an audio decoder 205, a CPU 208, a ROM 209, a RAM 210, a flash memory 211, a demultiplex-use RAM 212, a graphic processor 213, an RTC (Real Time Clock) 215, a remote controller I/F 216, and an Ethernet I/F 217.

The digital broadcast receiving apparatus receives a broadcast TV program via an antenna 200, processes it, and outputs it via screen or speaker as video output 250 or audio output 251, respectively.

The remote controller 220 is equipped, at least, with ten keys 221, direction buttons 222, an enter button 223, an EPG button 224.

Described first is the function of the transmission system shown in FIG. 1.

An EPG text (character data) is input via the EPG text input terminal 102, edited by the EPG text input apparatus 101, and stored in the EPG text storage 105. EPG video data is input via the EPG video data input terminal 104, edited by the EPG video data input apparatus 103, and stored in the EPG video data storage 106.

EPG data containing the EPG text (character data) and the EPG video data is then transmitted through the transmission channel via the Internet 113 or the transmission channel with the broadcast wave 121.

In the transmission channel via the Internet 113, the EPG data generating apparatus 110 receives the EPG text and the EPG video data from the EPG text storage 105 and the EPG video data storage 106, respectively. The apparatus 110 compiles EPG data with the EPG text and video data for each TV program and stores the EPG data in the network-use EPG data storage 111.

Stored in the network-use EPG data storage 111 is the EPG data containing the EPG text and video data, that is accessible with, for example, "http", a protocol on the Internet 113.

When the digital broadcast receiving apparatus (FIG. 2) accesses the EPG data via the Internet 113, the network server 112 retrieves the EPG text and video data from the network-use EPG data storage 111 and sends them out via the Internet 113.

This is so-called a pull-type operation in which, whenever the digital broadcast receiving apparatus requires EPG data, it accesses the EPG data via the Internet 113, and in response to that, the network server 112 retrieves the EPG text and video data from the network-use EPG data storage 111.

For the pull-type operation, the network server 112 may prestore a lot of EPG video data and send them out when the digital broadcast receiving apparatus determines that the video data is displayable.

When a broadcast wave is used to transmit EPG data, it is called a push-type operation. The transmitter sends EPG data several times in a short cycle or at a predetermined time, so that the digital broadcast receiving apparatus can receive it. This case is discussed later.

Figure 3:
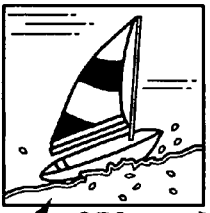
FIG. 3 illustrates an EPG displayed on screen at the digital broadcast receiving apparatus according to the present invention.

Illustrated in FIG. 3 is an EPG 300 displayed on screen at the digital broadcast receiving apparatus (FIG. 2), based on the EPG data obtained in the pull-type or push-type operation.

FIG. 3 and also FIGS. 4 and 5 which will be discussed later show just a schematic illustration of EPG, and the illustration may not exactly fit the following description of the EPG.

A TV-program zone 357 surrounded by a thick dot line is used for showing a TV program guide with time in the vertical direction and TV channels in the horizontal direction, like a TV program guide in a new paper.

Explained in this description is the TV program guide with time in the vertical direction and TV channels in the horizontal direction. The present invention is, however, applicable to a TV program guide with time in the horizontal direction and TV channels in the vertical direction.

Now, a TV program 358 is highlighted with GUI. The highlighted section can be shifted up/down or left/right with the direction buttons 222 of the remote controller 220 (FIG. 2). Data is scrolled in the zone 357 when the highlighted section is shifted to the outside of the zone 357.

Channel numbers, such as BS 101, BS 102, . . . , BS 203, are moved left/right when air time and TV program titles (with brief introductions) indicated as "00 xxxxxx", "30 xxxxxx", etc. ("00" and "30" indicate air time, for example, 7:00 PM and 8:30 PM, respectively, and "xxxxx" indicates a TV program title and a brief introduction), are moved left/right, for the indication of TV programs on the next TV channel, such as BS 100 or BS 204 (not shown in the TV-program zone 357). The time, such as 7:00 PM, 8:00 PM, etc., are scrolled up/down when the TV program titles are scrolled up/down, for the indication of TV programs on the time, such as 6:00 PM or 1:00 AM (not shown in the TV-program zone 157).

Displayed in a preview display 351 is an image of a TV program selected and viewed now. An indicator 352 indicates a network and a channel number of the TV program now viewed, such as "BS CH 101 ". The TV program displayed in the window 351 and indicated by the indicator 352 may be or may not be the same as that highlighted in the TV-program zone 357.

A network display 353 displays the type of network, such as BS digital, CS digital, terrestrial digital or terrestrial analog broadcasting of which a program guide is now being displayed in the TV-program zone 357.

A date-time display 354 displays the current date and time, such as "July 19 (WED) 7:00 PM". When the EPG 300 pops up, a TV program table including a TV program viewed at the current time is displayed in the TV-program zone 357, which varies depending on scrolling.

A program-contents display 355 displays a detailed explanation of the TV program 358 now highlighted in the TV-program zone 357. A date display 356 displays dates for five days, which may be more. When, a date "10 (WED)" is highlighted in the display 356, a TV program table for this date is displayed in the TV-program zone 357.

Figure 4:
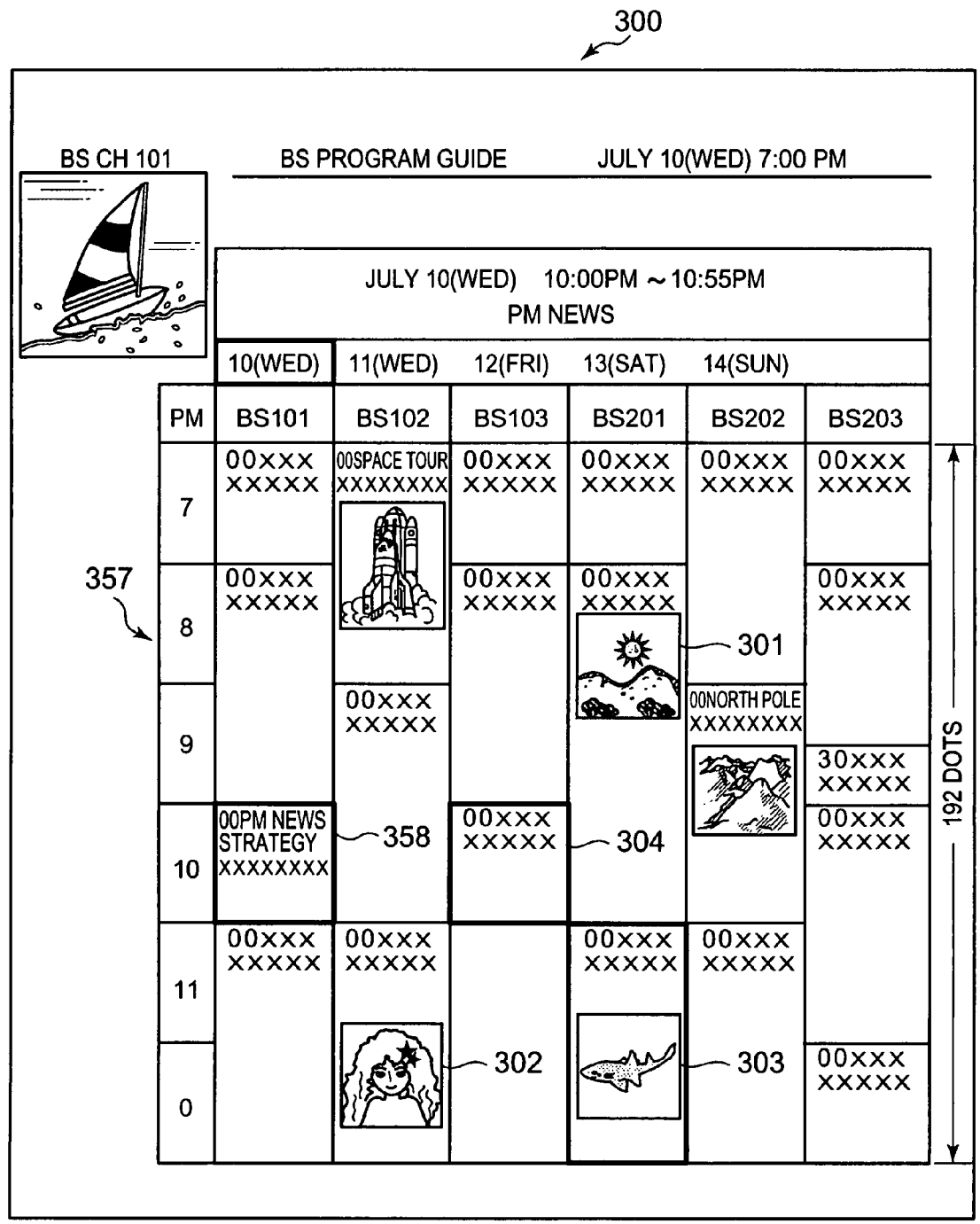
FIG. 4 illustrates another EPG displayed on screen at the digital broadcast receiving apparatus according to the present invention.
Figure 5:
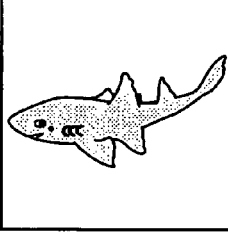
FIG. 5 illustrates still another EPG displayed on screen at the digital broadcast receiving apparatus according to the present invention.

Illustrated in FIGS. 4 and 5 are the EPG 300 and an EPG 300a, respectively, which can be displayed on a screen at the digital broadcast receiving apparatus (FIG. 2).

The EPG 300 displays a TV program table on 6 channels for 6 hours. The EPG 300a displays a TV program table on 3 channels for 3 hours with a larger displaying area for each TV program. Images 301, 302 and 303, and 801 and 802 are displayed on the EPGs 300 and 300a, respectively, each image being brief representation of the corresponding TV program.

The images 301 and 302 are similar to the images 801 and 802, respectively, in FIGS. 4 and 5. However, these images are just cartoon-like drawings of images actually displayed on EPG, and the similar images may not necessarily indicate the same TV program.

There might be the case in which an image that can be displayed on the EPG 300a cannot be displayed on the EPG 300 (or another EPG, not shown, for example, for 9 channels and 12 hours), depending on the resolution of the image, for example, whether it is in the HD or SD mode.

The EPG data transmitting apparatus 120 (FIG. 1) sends out EPG data with video data for such images 301, 302 and 303, and 801 and 802, with the broadcast wave 121, irrespective of whether the digital broadcast receiving apparatus (FIG. 2) requires it. This one-way operation is so-called a push-type operation.

The EPG data transmitting apparatus 120 repeatedly sends out the same EPG data so that the digital broadcast receiving apparatus can receive it any time, within, for example, 3 seconds to 1 minute for all of the data.

In order for the push-type operation, the EPG data transmitting apparatus 120 retrieves EPG data from the EPG text storage 105 and the EPG video data storage 106, and send it out, in real time (which is different from the pull-type operation described above). The EPG data to be sent out includes text (character) data and video data, or text data only, which depends on TV programs.

Described next is the operation of the digital broadcast receiving apparatus shown in FIG. 2.

In reception of a broadcast carried by an electromagnetic wave via the antenna 200 for terrestrial digital, a TV channel is selected by the tuner 201. The selected TV channel may carry one HD (at resolution of, for example, 1920×1080), several SDs (at resolution of, for example, 720×480) or both of HD and SD.

A broadcasting signal at the selected TV channel is subjected to a descrambling procedure at the descrambler 202 for a pay channel which has been scrambled so as not to be viewed freely. The descrambling procedure is executed only when a pay-channel subscriber card is inserted into the digital broadcast receiving apparatus.

The descrambled broadcasting signal is subjected to a demultiplexing procedure at the demultiplexer 203, to be divided into video data and audio data and stored in the demultiplex-use RAM 212. The video data and the audio data are then sent to the video decoder 204 and the audio decoder 205, respectively.

The compressed video data is decoded by the video decoder 204 and then superimposed with a GUI (Graphic User Interface) image at the graphic processor 213. The GUI-image-superimposed video data is sent out to a monitor (not shown) as a video out 250.

The compressed audio data is decoded by the audio decoder 205 and output as an audio output 251 via an audio amplifier (not shown).

The tuner 201, the descrambler 202, the demultiplexer 203, the video decoder 204, and the audio decoder 205 are connected to the CPU 208 via a bus, and under control by the CPU 208. Also connected to the CPU 208 are the ROM 209 for storing programs for use in CPU, the RAM 210 for storing variables for use in CPU, the flash memory 211, the RTC 215, the remote controller I/F 216.

The demultiplexer 203 also extracts SI (Service Information) or PSI (Program Specific Information) and a data carousel from the descrambled broadcasting signal and temporarily stores them in the demultiplex-use RAM 212. Then, the CPU 208 retrieves the information, compiles it for EPG if it is SI and stores the complied information in the RAM 210. The CPU 208 also retrieves a BML (Broadcast Markup Language) text from the data carousel and stores it in the RAM 210. The BML text is executed automatically or via a user operation. In the BML text, a GUI image is displayed on a screen via the graphic processor 213. When EPG data is requested by a user, it is displayed on the screen via the graphic processor 213. The EPG data may include TV-program data of today and coming days (such as 7 days).

The flash memory 211 is a non-volatile memory that holds data even if power is down. EPG data is transferred from the RAM 210 to the flash memory 211 before power is down. The flash memory 211 is described here as a memory means that holds EPG data even if power is down. However, the RAM 210 may be arranged so that it can hold EPG data even if power is down, instead of the flash memory 211.

The RTC 215 is a clock that may store time with a built-in crystal oscillator or based on time data included in SI extracted from the broadcasting signal. In the latter case, the CPU 208 retrieves time data TOT included in SI from the demultiplex-use RAM 212 via the demultiplexer 203 and stores it in the RTC 215. In either case, the CPU 208 can retrieve time data from the RTC 215.

The remote controller I/F 216 receives and holds a command sent by the remote controller 220 and carried by infrared rays 253. The CPU 208 retrieves the command and decodes it to know whether it is issued by operation of the ten keys 221, the direction buttons 222, the enter button 223, the EPG button 224, etc.

The Ethernet I/F 217 cooperates with the CPU 208 for communications over the Internet via Ethernet 254 with TCP (Transmission Control Protocol)/IP (Internet Protocol) running on the CPU 208 or the Ethernet I/F 217.

EPG data is received through the hardware described above and stored in the RAM 210, the flash memory 211, etc., for displaying EPG with TV program titles.

When a user depresses the EPG button 224, the EPG data including text and video data associated with TV programs is retrieved by the CPU 208 from the flash memory 211, compiled and displayed on the screen through the graphic processor 213.

Then, the EPG 300 is displayed on the screen as shown in FIG. 4. Displayed in the TV-program zone 357 are images 301, 302, 303, etc., for use in explaining TV programs with TV program titles (with brief introductions), such as "00 SPACE TOUR" aired from 7:00 PM to 9:00 PM. A highlighted section 358 indicates a TV program of PM NEWS aired from 10:00 PM to 11:00. Likewise, in FIG. 5, displayed in the EPG 300a are a movie "MANEATER" aired from 7:00 PM to 9:00 PM on BS 101 and TOP NEWS in a highlighted section 359 aired from 9:00 PM to 10:00. A section 304 in FIG. 4 will be discussed later.

One factor to be considered in displaying the EPG 300 is the number of dots for each TV program title (with a brief introduction) for a specific number of hours because hours are aligned in the vertical direction in the TV-program zone 357.

The above factor is discussed with reference to FIG. 4. The TV-program zone 357 requires a certain amount of dots, for example, 192 dots in the vertical direction with 16 dots for one character also in the vertical direction, for displaying a TV program schedule for 6 hours, for example, from 7:00 PM to 0:00 AM, as shown in FIG. 4. The number of dots for one hour is 32 (=192/6) dots which allows 2 lines of a character text (16 dots for one character) for one hour in the vertical direction, for a 1-line character text for 30- to 59-min TV programs and a 2-line character text for 60- to 89-min TV programs.

In contrast, video data requires, in general, about 30 dots in minimum in the TV-program zone 357 in the vertical direction so that a user can recognize its contents. It is about 32 dots that is an integer multiple of 16-dot character data in the above case.

Discussed below is the size of video data, an integer multiple of 16×16 dots for one character at common screen aspect ratios of 4:3 or 16:9 in width to height.

Shown in FIG. 6 are several examples of the size of video data in width (W) and height (H), at a specific number of dots for video data in height (the vertical direction) that is an integer (2 or more) multiple of 16×16 dots for one character at the screen aspect ratios of 4:3 and 16:9 in width to height. Listed in the left-most column of FIG. 6 are 32, 48, 64, 80, . . . the number of dots in height for video data (video data height in dots). The minimum number of dots is 32 (=16×2) because 16 (=16×1) causes a blurred image, even though it is an integer multiple of 16×16 dots for one character.

Shown in FIG. 7 are several examples of the size of video data in width (W) and height (H), at a specific number of dots for video data in width (the horizontal direction) that is an integer (3 or more) multiple of 16×16 dots for one character at the screen aspect ratios of 4:3 and 16:9 in width to height. Listed in the left-most column of FIG. 7 are 48, 64, 80, 96, . . . the number of dots in width for video data (video data height in dots). The minimum number of dots is 48 (=16×3) because 32 (=16×2) in width gives 24 in height that is smaller than 32, which causes a blurred image.

There are few cases in FIGS. 6 and 7 in which the number of dots for video data that is an integer multiple of 16×16 dots for one character, in both of width and height.

If the number of dots discussed above is not an integer multiple of 16×16 dots for one character, in both of width and height, there is inevitably a space between video data and associated character data because the starting point of characters to be written is limited to a location, an integer multiple of the location of the characters. EPG video data is basically small, so that even a slight variation in image size gives different graphic effects.

Variation in aspect ratio from an original to another one to video data could alter an original image carried by the video data, which could pose a problem under the copyright law.

The present invention, however, gives appropriate graphic effects to EPG by adjusting the size of video data at least in height (the vertical direction) or width (the horizontal direction) so that the size of video data becomes an integer multiple of the size of one character in the associated character data.

Figure 8:
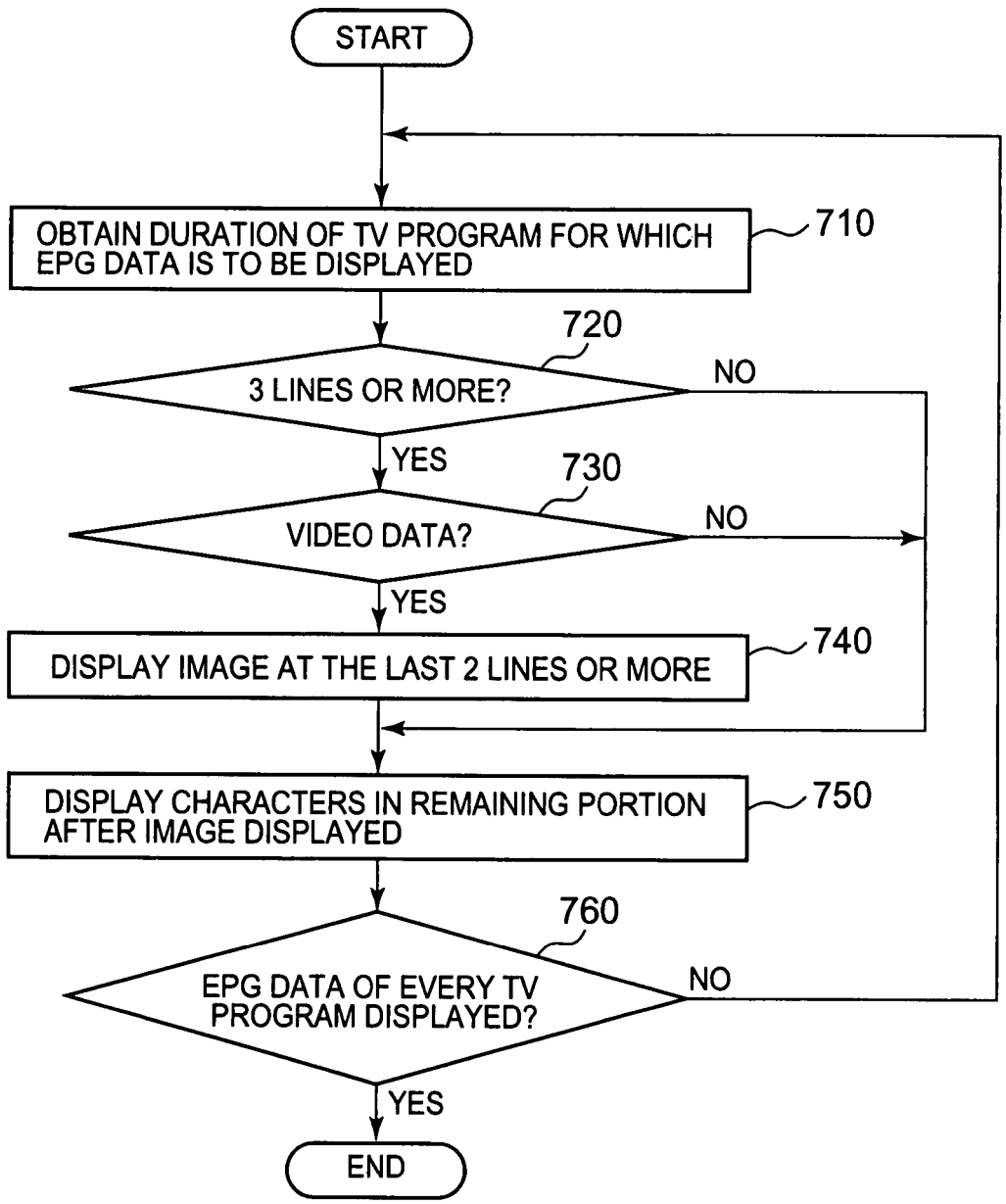
FIG. 8 shows a flowchart for the digital broadcast receiving apparatus according to the present invention to execute in displaying an EPG shown in FIG. 4 or 5.

Described next with reference to FIG. 8 is a method of displaying the EPG 300. FIG. 8 shows a flowchart for the CPU 208 in the digital broadcast receiving apparatus (FIG. 2) to execute in displaying the EPG 300 (or EPG 300a).

The CPU 208 executes steps 710 to 760 shown in FIG. 8 to the TV programs (for which titles and brief introductions are to be displayed in the TV-program zone 357 of the EPG 300), starting, for example, from the left uppermost in the zone 357, as shown in FIG. 3.

In step 710, duration is obtained from the RAM 210 (FIG. 2) for a TV program, for example, for which the title and the brief introduction are to be displayed in the left uppermost in the TV-program zone 357.

Next, in step 720, it is determined whether the obtained duration has a length of, for example, 3 lines or more in the TV-program zone 357. The length of 3 lines corresponds to 48 (=16×3) dots when displaying EPG data in the TV-program zone 357, for example, with 192 dots, like shown in FIG. 4, with 16 dots in height for one character. In other words, it is determined whether the target TV program will be aired for 1.5 (=48/(192/6)) hours or more.

The reason for this determination is that a TV program with duration having a length of 3 lines or more requires one line or more for displaying a TV title with an associated brief introduction (character data) with 16 dots and 2 lines or more just under the former line, for displaying an image (video data) in the TV-program zone 357. In other words, the zone 357 requires 48 dots or more for 3 lines in minimum for each TV program.

When it is determined that the obtained duration has a length of fewer than 3 lines (NO) in the in step 720, it goes to step 750 for a regular EPG-data displaying procedure.

On the contrary, when it is determined that the obtained duration has a length of 3 lines or more (YES) in the in step 720, the procedure goes to step 730.

In step 730, it is determined whether there is video data to be displayed in the TV-program zone 357. When obtaining video data from the broadcast wave 121 (which will discussed later), it is determined whether the video data is already obtained.

When it is determined that there is no video data to be displayed (NO) in the in step 730, the procedure goes to step 750 for the regular EPG-data displaying procedure.

On the contrary, when it is determined that there is video data to be displayed (YES) in the in step 730, the procedure goes to step 740.

In step 740, the image for the target TV program is displayed for the last 2 lines or more under the one line or more for which the TV title and the associated brief introduction are to be displayed. The image can be displayed fully in width like the image 801 or on the left side like the image 802, as shown in FIG. 5.

Next, in step 750, the TV title and the associated brief introduction (character data) are displayed for one line or more except the last 2 lines or more for which the image (video data) is being displayed. When an image is displayed on the left side like the image 802, as shown in FIG. 5, character data is displayed in the remaining right side section. A reference numeral 803 in FIG. 5 indicates that character data might not be displayed for a shorter TV program.

The procedure described above is that video data is displayed first and then character data is displayed in the remaining section per TV program in the TV-program zone 357 (or 357a) of the EPG 300 (or EPG 300a).

One option is that character data is displayed first and then video data is displayed in the remaining section per TV program in the TV-program zone 357 of the EPG 300.

The option procedure is executed as follows: It is. determined whether EPG data contains video data in addition to character data per TV program. If not, character data only is displayed for the corresponding TV program. On the contrary, if video data is contained for a certain TV program, it is determined whether there is a specific minimum space for displaying an image after displaying character data. If not, the character data only is displayed for this TV program. In contrast, if there is such a space, the character data is displayed and then the image is displayed as large as possible with least change in aspect ratio. The image may be enlarged in height or width by an multiple integer of the character data size.

The option is described more with reference to FIG. 4. The TV-program zone 357 shown in FIG. 4 has the space of 192 dots in height for 6 hours. This means one hour corresponds to 32 dots which allows displaying character data of 2 lines with 16×16 dots in height per character for a 1-hour TV program.

The number of dots for a 2-hour and 15-min (2.25-hour) TV program is 72 (=32×2.25) in height. Character data of 2 lines can be displayed with 32 (=16×2) dots per character in height. The remaining space in height corresponds to 40 (=72−32) dots for the 2-hour and 15-min TV program. Here, the size in width in the TV-program zone 357 corresponds to 200 dots for one TV program. Thus, the remaining space in height and width corresponds to 40×200 dots. If the minimum space for displaying an image corresponds to 40×40 dots, the remaining space of 40×200 dots is larger than the minimum space, and hence it is determined that an image can be displayed in the remaining space. Character data is then displayed so that the remaining space for the video data has at least 40 dots in height (the minimum size in height for the video data) for the 2-hour and 15-min (1.25-hour) TV program. The video data to be displayed in the remaining space has 53 (=(40/3)×4) dots in width if the video data has an aspect ratio of 4:3.

The size in width in the TV-program zone 357 corresponds to 200 dots for one TV program. Each character has 16×16 dots. The maximum number of characters that gives video data 53 dots in width is 9 (=int((200−53)/16)). Here, int(a) is the maximum integer equal to "a" or smaller. All of the 9 characters may not necessarily be displayed. One or more blank characters can be added when 8 or fewer characters are displayed.

Then, video data of 53 dots in width is displayed in the space of 56 (=200−9×16) dots in width, with 3 dots remaining.

In the description above, the calculation is made for the size of video data in width after the size is adjusted in height. Not only that, the calculation is made for the size of video data in height after the size is adjusted in width.

The size of video data corresponds to 32 dots (in height)× 48 dots (in width) when the size in height is calculated by an integer multiple of the size of character data. In contrast, the size of video data corresponds to 24 dots (in height)×32 dots (in width) when the size in width is calculated by an integer multiple of the size of character data. The size of 32 dots (in height)×48 dots (in width) is more feasible for displaying larger images.

With reference to FIG. 8 again, the procedure goes to step 760 to determine whether EPG data of every TV program has been displayed in the EPG 300 (or EPG 300a). If NO in step 760, the procedure returns to step 710 to repeat steps 710 to 760 whereas if YES in step 760, the procedure ends.

EPG data for the EPG 300 (or EPG 300a) can be obtained either via the broadcast wave 121 or Internet 113, as shown in FIG. 1.

When obtaining EPG data via the broadcast wave 121, the data header is subject to section filtering at the demultiplexer 203 (FIG. 2) to get MPEG-2 section data. The filtered data is sent to the demultiplex-use RAM 212 and also to the CPU 208 for data analysis to get video data. The section data may contain a data carousel. Video data may not necessarily be involved in EPG data together with character data. Video data may be obtained from another data source. Or, video data may be put into EPG data in a different way.

When obtaining EPG data via the Internet 113, the CPU 208 accesses a particular site via the Ethernet 254 connected to the Ethernet I/F 217, to get video data. It is possible to obtain EPG data via the broadcast wave 121 and/or video data via the Internet 113.

There is a variety of sizes for video data obtained as described above. The size of video data may not always be an integer multiple of character data to be displayed on a digital broadcast receiving apparatus. The size of character data depends on manufactures of digital broadcast receiving apparatuses, such as, 16×16 or 18×18. A particular digital broadcast receiving apparatus is capable of displaying several sizes of character data.

Referring back to FIG. 3, now the TV program 358 is highlighted. The highlighted section changes color when shifted to up, down, left or right under control by the direction buttons 222 of the remote controller 220 (FIG. 2). The background color changes, such as to green, for characters and also blank characters in the highlighted section.

The color change is discussed more with reference to FIG. 4. When the section 304 is highlighted, the background color changes to green for characters "00 xxxxx" and also blank characters just under characters "xxxxx". When the highlighted section is shifted to the section with characters "00 xxxxx" with the associated image 303, the background color changes to green for the characters "00xxxxx" and blank characters, but not for the image 303, the color of which remains unchanged in this embodiment. It is feasible that the background of the image 303 is returned to blank, colored with green the same as the characters and then the image 303 is displayed once again.

In FIG. 4, the sections 303, 304 and 305 are indicated by the thick lines which express that the sections are highlighted. However, these sections are not be highlighted at the same time.

As disclosed above in detail, according to the embodiment of the digital broadcast receiving apparatus of the present invention, an image (video data) associated with each TV program is displayed in an EPG as the size of the image is enlarged in height or width by an integer multiple of the size of character data associated with the TV program. Thus, EPG visual recognition is enhanced so that a user can correctly and quickly recognize the contents of TV programs.

Embodiment 2

Disclosed next is an embodiment 2 according to the present invention in which video data is displayed in an EPG only for TV programs, duration of which is equal to a preset time or longer.

Such a preset time is different between the EPG 300 for 6 hours at 6 channels and the EPG 300a for 3 hours at 3 channels shown in FIGS. 4 and 5, respectively: for example, 2 hours (64 dots) and 1 hour (64 dots) for the EPG 300 and the EPG 300a, respectively. Video data is displayed only for TV programs, duration of which is 2 hours or longer and 1 hour or longer, for the EPG 300 and the EPG 300a, respectively. In other words, video data is not displayed for TV programs, duration of which is shorter than 2 hours and 1 hour, for the EPG 300 and the EPG 300a, respectively.

For TV programs, duration of which is the preset time or longer, a program title and the associated image may only be displayed, with no other character data, such as a brief introduction of a TV program. The title and image may be displayed when the duration of a TV program corresponds at least to 48 dots (=16 dots for one line of a program title +32 dots for the minimum image displaying space, an integer multiple of the number of dots of the program title). The minimum image displaying space may, however, not be an integer multiple of character data size in the embodiment 2.

It is determined whether EPG data contains video data in addition to character data for each TV program. If not, the character data is only displayed in the EPG. On the contrary, if the video data is contained, it is further determined whether there is the minimum image displaying space after a program title is displayed for one line in the EPG for each TV program.

If not, the program title and the associated character data, such as a brief introduction, are displayed in the EPG for each TV program. On the contrary, if there is the minimum image displaying space, the program title is displayed and also the video data is displayed in the minimum image displaying space. And, if there is an enough space of, for example, 16 dots or more, for the associated character data, the character data is also displayed.

According to the embodiment 2, as disclosed above, video data is displayed in EPG only for TV programs, duration of which is a preset time or longer, thus EPG data can be effectively displayed, and hence EPG visual recognition is enhanced so that a user can correctly and quickly recognize the contents of TV programs.

Moreover, according to the embodiment 2, the preset time is different between the EPG 300 for 6 hours at channels and the EPG 300a for 3 hours at 3 channels shown in FIGS. 4 and 5, respectively, thus appropriate EPG displaying being provided depending on how many hours are displayed on EPG at a time.

Moreover, video data is displayed after a program title when there is a minimum image displaying space after the program title is displayed for one line. Thus, even if an EPG-data displaying section in the TV-program zone 357 becomes small for each TV program, duration of which is equal to a preset time or longer, at least the program title and the associated video data are displayed, and hence EPG visual recognition is enhanced.

Embodiment 3

Disclosed next is an embodiment 3 according to the present invention in which an EPG for a predetermined time range (6 hours, 3 hours, etc.) based on EPG data stored in the flash memory 211 (FIG. 2) is scrolled at a fixed interval (1 hour, 30 minutes, etc.) while being displayed, and when a displaying width in the vertical (height) direction becomes smaller than a reference value while scrolling, EPG data displayed in the displaying width is erased from the flash memory 211.

Also in the embodiment 3, the size (the number of dots) of video data is set as an integer multiple of the size (the number of dots) of character data, such as two times. Nevertheless, the integer multiple is not an essential factor in the present invention.

It is determined in the embodiment 3, per elapse of a specific time, such as one minute, whether there is a TV program finished in the EPG 300 (or EPG 300a). If there is, the EPG data of the finished TV program is erased from the flash memory 211. For example, for a TV program aired from 7:00 PM to 7:30 PM, the EPG data of this TV program is erased from the flash memory 211 at 7:30 PM and thus no display on the EPG 300 for this program. This procedure avoids useless channel selection or preset recording for TV programs already finished.

Moreover in the embodiment 3, an EPG for a predetermined time range (6 hours, 3 hours, etc.) is scrolled by 1-hour duration whenever time elapses from 59 minutes of a certain hour to the next hour (for example, from 7:59 PM to 8:00 PM), and when a displaying width (the number of dots) in the vertical (height) direction after scrolled becomes smaller than a reference value, EPG data displayed in the displaying width is erased from the flash memory 211.

For a TV program, duration of which is, for example, 7:00 PM to 8:55 PM (115 minutes), aired now at 7:00 PM and the associated EPG data is displayed in the EPG 300 for 6 hours with 192 dots in height, such as shown in FIG. 4, the associated EPG data can be displayed with 61 (=(115/60)×(192/6))

dots in height. The number of dots in height for video data are 32, 48, 64, 80, . . . , each being an integer multiple of the size of character data of 16×16 dots, with the number of dots in width and height as listed in FIG. 6 at the aspect ratio of 4:3 or 16:9. The number of dots in height for the TV program with a 115-min duration is 61 dots as discussed above. Thus, the associated video data can be displayed with 48 dots maximum in height.

When time elapses and, for example, it is 8:00 PM, the TV program, duration of which is 7:00 PM to 8:55 PM (115 minutes) aired now has 55 minutes remained. And, a remaining displaying width in the EPG 300 for this TV program is only 29 (=55×32/60) dots in height. The associated video data thus cannot be displayed with 48 dots, 32 dots, etc., an integer (2 or more) multiple of the size of character data of 16×16 dots. Thus, the associated video data disappears from the EPG 300 while the program title and the associated character data of 16×16 dots are still being displayed.

Accordingly, in the embodiment 3, when the EPG 300 (or EPG 300*a*) is scrolled, video data (for a TV program now on air) that cannot be displayed in the EPG 300 due to a short remaining duration for this TV program, is erased from the flash memory 211 even though the TV program is not finished.

Moreover, in the EPG 300 available for 6 channels at a time for 6 hours, even if all EPG data for TV programs at 6 channels can be displayed for 6 hours, all of the video data that cannot be displayed due to scrolling as discussed above are erased from the flash memory 211 including video data which has not been displayed. This function allows smaller capacity to the flash memory 211.

Figure 9:
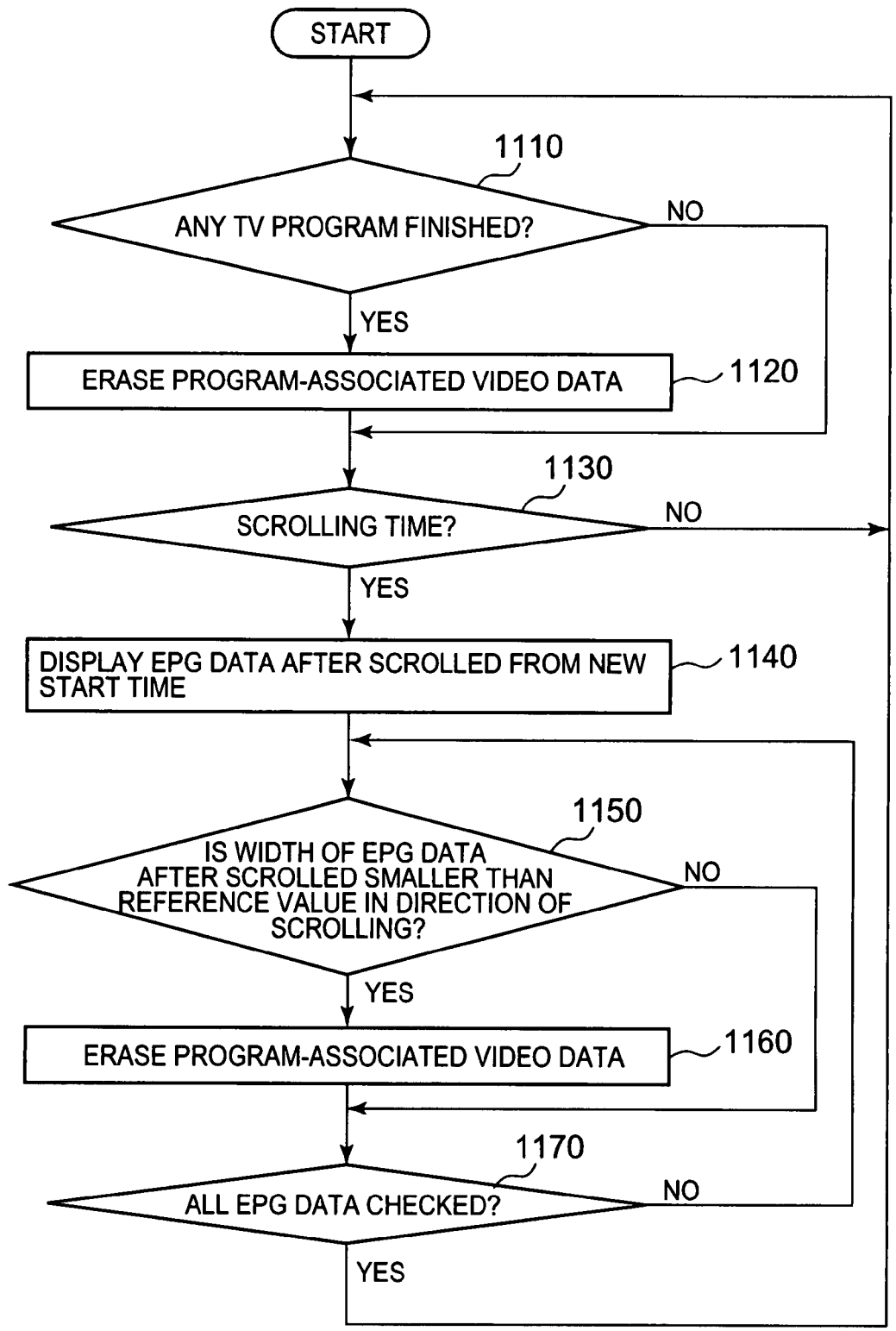
FIG. 9 shows a flow chart of a scrolling procedure executed by the digital broadcast receiving apparatus according to the present invention.

The scrolling procedure described above in the embodiment 3 is described more in detail with reference to FIG. 9 that shows a flow chart of the scrolling procedure executed by the CPU 208 (FIG. 2).

The scrolling procedure starts while the EPG 300 is being displayed as shown in FIG. 4 (or the EPG 300*a* in FIG. 5).

In step 1110, it is determined per fixed interval (1 min, 2 min, 3 min, etc.) under control by a system clock (not shown) whether there is a TV program now on air but finished soon.

If there is such a TV program (YES in step 1110), video data associated with this program is erased from the flash memory 211 and disappeared from the EPG 300, in step 1120. On the contrary, if there is no such a TV program (NO in step 1110), step 1120 is not executed. Character data associated with the TV program questioned in step 1110 is stored in the flash memory 211 with other character data associated with other TV programs per 3 hours, for example. The character data is then erased from the flash memory 211 per 3 hours, for example, with another procedure different from that shown in FIG. 9. Nevertheless, the character data may be erased with the video data from the flash memory 211.

Then, in step 1130, it is determined whether it is a scrolling time at a fixed interval (1 hour, 30 minutes, etc.). If the current time is not the scrolling time (NO in step 1130), the procedure returns to step 1110. On the contrary, if the current time is the scrolling time (YES in step 1130), the EPG 300 is scrolled by a certain scrolling width in the vertical (height) direction. The following description on scrolling is made with a scrolling time at an interval of one hour and a scrolling width corresponding to one hour.

Then, in step 1140, displayed in the EPG 300 is EPG data at the current time but scrolled by the scrolling width corresponding to a time frame from the current time to one hour. Here, the EPG data displayed after scrolling contains data on TV programs for 3 hours from the time of scrolling.

The CPU 208 then accesses the flash memory 211 to determine whether the width (the number of dots) of the EPG data having video data at the current scrolling time is smaller than a reference value (such as, 48 dots) in the vertical (height) direction, in step 1150.

If the width (the number of dots) of the EPG data is smaller than the reference value of 48 dots (YES in step 1150), the video data of the EPG data is erased from the flash memory 211, in step 1160.

On the contrary, if the width (the number of dots) of the EPG data is not smaller than, or equal to or larger than the reference value of 48 dots (NO in step 1150), the video data erasing procedure in step 1160 is not executed.

It is determined in step 1170 whether step 1150 is executed for all of the EPG data stored in the flash memory 211. If not (NO in step 1170), the procedure returns to step 1150.

All of the EPG data mentioned above include EPG data not displayed in the EPG 300 in addition to the displayed data. Thus, "all of the EPG data" means every EPG data stored in the flash memory 211. Nevertheless, it is feasible to check only the EPG data displayed in the EPG 300 in step 1170, which makes step 1170 faster due to fewer number of data to be checked. In contrast, checking every EPG data stored in the flash memory 211 makes step 1170 slower due to more number of data to be checked, which however increases the amount of video data to be erased in step 1160, thus allowing lower storage capacity to the flash memory 211. It is also feasible that EPG data actually subjected to step 1150 are those only for TV programs to be aired or already aired at the current scrolling time, even though every EPG data stored in the flash memory 211 is subjected to checking, which also makes step 1150 faster due to fewer number of data to be checked.

On the contrary, when it is determined in step 1170 that step 1150 is executed for all of the EPG data stored in the flash memory 211 (YES in step 1170), the procedure returns to step 1110.

As disclosed above, according to the embodiment 3, when the EPG 300 is scrolled by a certain scrolling width at every scrolling time, in step 1140, for all of EPG data stored in the flash memory 211, video data of EPG data having the width (the number of dots) in the vertical (height) direction that is smaller than a reference value (such as, 48 dots) is erased from the flash memory 211 in step 1160.

The scrolling procedure in the embodiment 3 will be discussed more in detail.

Figure 10:
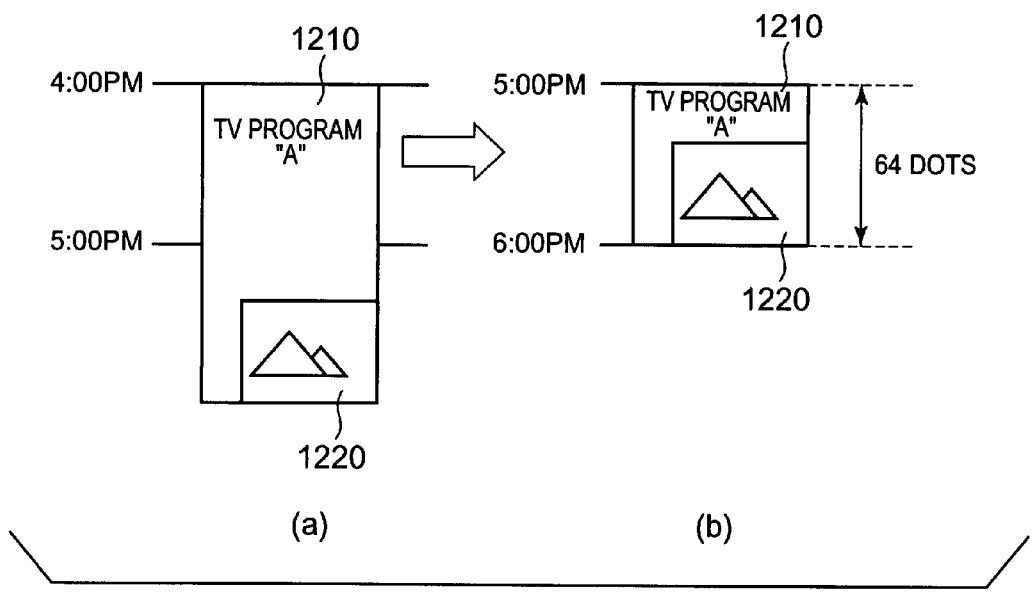
FIG. 10 illustrates how EPG data for a TV program displayed in the EPG is moved by scrolling.

FIG. 10 illustrates how EPG data 1210 for a 2-hour TV program "A".and displayed in the EPG 300 is moved by 1-hour scrolling at 5:00 PM, for example. The EPG data 1210 is used for the TV program "A" aired from 4:00 PM to 6:00 PM. Thus, displayed in (a) of FIG. 10 at the current time, such as 4:00 PM, are character data (not shown) and video data 1220. Then, at 5:00 PM, the scrolling time, the EPG data 1210 is moved by 1-hour scrolling and displayed for one hour, as shown in (b) of FIG. 10.

The number of dots in FIG. 10 is, for example, 64 in height for displaying EPG data for one hour, which corresponds to displaying EPG data for 3 hours in 192 dots in height. Video data is displayed for a TV program aired for 45 minutes or more, for which EPG data has 48 dots or more in height, in EPG for 3 hours at 192 dots in height.

Illustrated in (b) of FIG. 10 is a display of the EPG data 1210 for one channel only, with the upper edge of the EPG data 1210 being at the upper edge of the TV-program zone 357 (FIG. 3). The EPG data 1210 is displayed for one hour, with the lower section (from 6:00 PM) being not shown.

In (a) of FIG. 10, when the current time is 4:59 PM, the upper edge of the EPG data 1210 is at 4:00 PM. The TV program "A" is a 2-hour program aired from 4:00 PM to 6:00 PM. Thus, the EPG data 1210 for the TV program "A" has 128 (=64×2) dots in height which is more than 48 dots. The video data 1220 is thus displayed with character data (not shown). If the EPG data 1210 contains no video data, such video data is, of course, not displayed.

At 5:00 PM, as shown in (b) of FIG. 10, the TV program "A" has one hour remained and the EPG data 1210 has 64 (>48) dots in height, so that the video data 1220 is still displayed.

Figure 11:
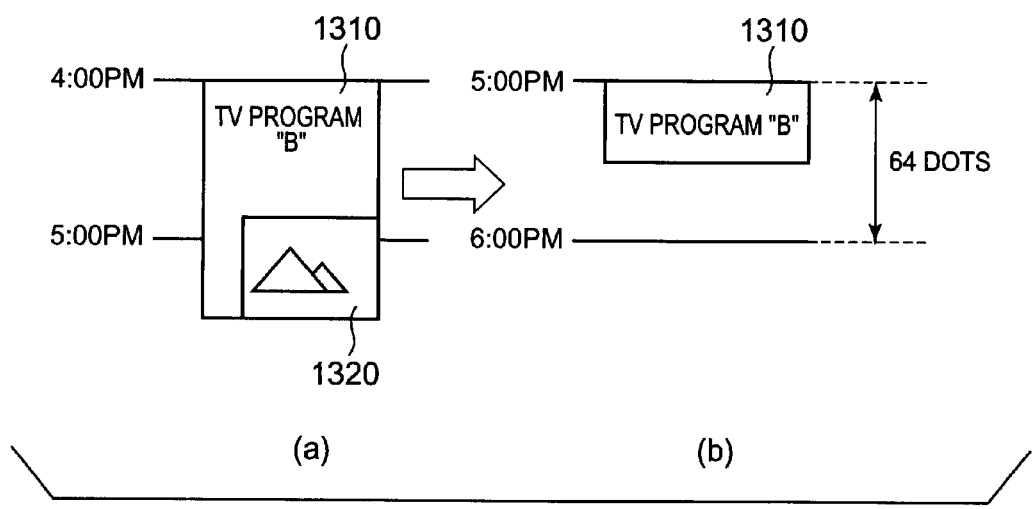
FIG. 11 also illustrates how EPG data for a TV program displayed in the EPG is moved by scrolling.

FIG. 11 illustrates how EPG data 1310 for a 1.5-hour TV program "B" and displayed in the EPG 300 is moved by 1-hour scrolling at 5:00 PM. The TV program "B" is a 1.5-hour program aired from 4:00 PM to 5:30 PM.

Illustrated in (a) of FIG. 11 is that the current time is between 4:00 PM to 5:00 PM, with the upper edge of the EPG data 1310 being at 4:00 PM. The EPG data 1310 has 96 (=64 (dots/hour)×1.5 (hour)) dots in height that is more than 48 dots so that video data 1320 is displayed.

When at 5:00 PM, the upper edge of the EPG data 1310 is at 5:00 PM by scrolling, as shown in (b) of FIG. 11. The TV program "B" has 0.5 hours to be aired at 5:00 PM and hence has 32 (=64 (dots/hour)×0.5 (hour)) dots that is fewer than 48 dots so that the video data 1320 cannot be displayed.

It is determined "YES" at step 1150 of FIG. 9 in the situation shown in (b) of FIG. 11. Thus, the video data 1320 is erased from the flash memory 211. Under the procedure, video data is erased from the flash memory 211 for TV programs aired for 45 minutes or longer but shorter than 1 hour and 45 minutes when scrolled by one hour because the number of remaining dots in height for their EPG data is fewer than 48 dots. The video data thus not displayed is erased from the flash memory 211 when scrolled even though the corresponding TV program is still being aired, which allows lower storage capacity to the flash memory 211.

Figure 12:
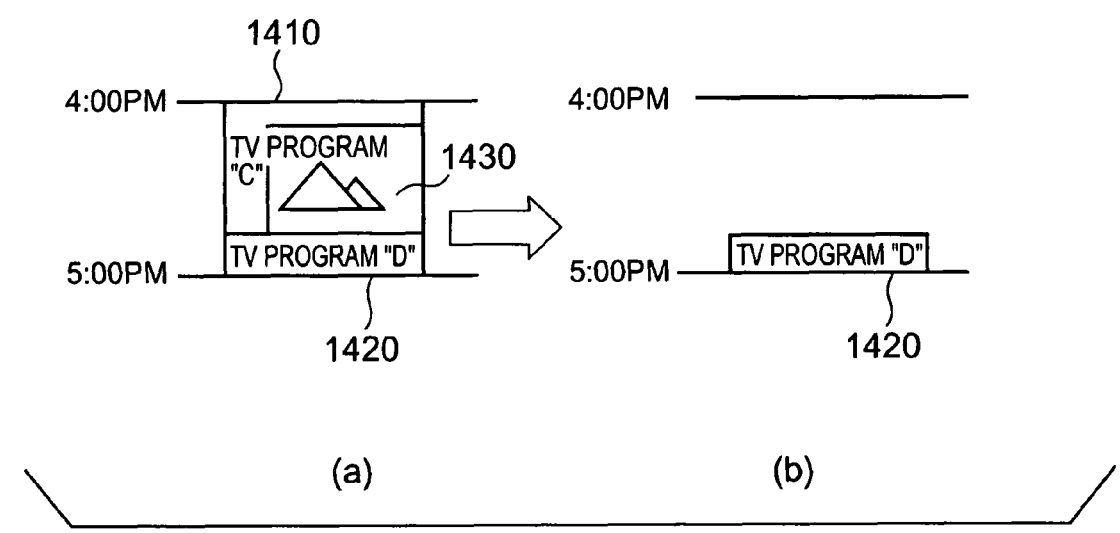
FIG. 12 also illustrates how EPG data for a TV program displayed in the EPG is moved by scrolling.

FIG. 12 illustrates change in display of EPG data 1410 for a 45-min TV program "C" aired from 4:00 PM to 4:45 PM, that does not finish on the hour.

Illustrated in (a) of FIG. 12 is EPG data displayed at 4:44 PM, including the EPG data 1410 for the 45-min TV program "C" and also EPG data 1420 for a 15-min TV program "D" aired from 4:45 PM to 5:00 PM.

The EPG data 1410 has 48 (=64 (dots/hour)×0.75 (hour)) dots in height equal to 48 dots so that video data 1430 is displayed.

The TV program "C" finishes at 4:45 PM, so that the EPG data 1410 containing the video data 1430 is erased from the flash memory 211, as shown in (b) of FIG. 12, with the upper edge of the EPG data being still at 4:00 PM.

In other words, referring to FIG. 9, video data erased from the flash memory 211 are those (erased in step 1120) for TV programs finished ("YES" in step 1110) and also those (erased in step 1160) for TV programs for which EPG data has smaller dots in height than a reference value ("YES" in step 1150) when scrolled in step 1140.

The number of cases in which video data is erased in step 1120 is fewer than that in which video data is erased in step 1160, in FIG. 9. Suppose that video data is displayed when the associated EPG data has "k" dots that is more than "m" dots in height for one hour display. A TV program for which video data is erased in step 1120 is a program that stars on the hour and continues for 60×m/k minutes or more but less than one hour or a program that is aired for 60×m/k minutes or more but finishes within one hour from on the hour, with k>m for the associated EPG data. There are few cases in which "k" is extremely larger than "m", or "k" is several-fold compared with "m" because an EPG is mostly displayed with about 192 dots in height for 3- or 6-hour display at typical resolution or typical program construction. This leads to m/k being closer to 1, so that there are few cases in which video data is erased in step 1120.

Accordingly, video data erased from the flash memory 211 in the embodiment 3 are those for TV programs finished and also those for TV programs for which EPG data has smaller dots in height than a reference value when scrolled, thus allowing lower storage capacity to the flash memory 211.

Moreover, according to the embodiment 3, video data is erased early when it is moving-picture data with a larger amount of data or the number of pieces of video data is increased for a larger number of TV programs or channels on EPG, which also allows lower storage capacity to the flash memory 211, with higher cost performance.

Furthermore, according to the embodiment 3, video data is not displayed and erased from the flash memory 211 at the timing of scrolling while EPG data is being displayed and when the width of EPG data for a TV program in the vertical direction is smaller than a reference value, thus allowing lower storage capacity to the flash memory 211.

Moreover, according to the embodiment 3, erasure of video data not to be displayed at the EPG-data scrolling timing is mostly performed per fixed interval of one hour, for example. The video data erasure per fixed interval of one hour allows other procedures in-between succeeding erasing procedures, such as, obtaining logos of broadcasting stations which takes 13 minutes for each station but can be done for 4 (based on 60/13) stations per hour.

Embodiment 4

Disclosed next is an embodiment 4 according to the present invention.

The TV-program zone 357 shown in FIG. 4 is used in a 6-hour mode to display EPG data for 6 hours with 192 dots in height. In contrast, a TV-program zone 357a shown in FIG. 5 is used in a 3-hour mode to display EPG data for 3 hours with 192 dots in height. The display mode can be switched via the remote controller 220. The present invention is available for other display modes, such as, a 4-hour mode, a 2-hour mode and a 5-hour mode besides the 2 types of modes.

The TV-program zone 357a (3-hour mode) of FIG. 5 is shorter than the TV-program zone 357 (6-hour mode) of FIG. 4 because the former is for 3 hours and the latter is for 6 hours. Nevertheless, both have 192 dots in height for displaying EPG data.

Difference is that the 3-hour mode has 64 dots in height per hour whereas the 6-hour mode 32 dots in height per hour. Video data is displayed in the 3-hour mode for TV programs aired for 45 minutes or longer whereas for TV programs aired for 1.5 hours or longer in the 6-hour mode, at 48 dots or more in height for EPG data.

Suppose that there is a TV program aired from 7:00 PM to 8:55 PM. At 7:00. PM, the 3-hour mode (FIG. 5) can provide 48-dot video data because it can provide a display of 122 (=115×64/60) dots in height. In the same way, the 6-hour mode (FIG. 4) can provide 48-dot video data at 7:00 PM because it can provide a display of 61 (=115×32/60) dots in height. At 8:00 PM, for the TV program mentioned above with the remaining duration of 55 minutes, the 3-hour mode can still provide video data because it can provide a display of 58 (=55×64/60) dots in height. On the contrary, the 6-hour mode cannot provide video data at 8:00 PM because it provides a display of 29 (=55×32/60) dots only in height.

Accordingly, when video data is displayed at 7:00 PM in the 6-hour mode but cannot be displayed at 8:00 PM in this mode, the mode can be switched to the 3-hour mode via the remote controller 220 so that video data can be displayed in EPG. Thus, the video data is not erased from the flash memory 211 at 8:00 PM, in the embodiment 4 of the present invention.

The embodiment 1 of the present invention disclosed first does not provide such display mode switching, so that video data displayed at 7:00 PM in the 6-hour mode cannot displayed at 8:00 PM in this mode and hence erased from the flash memory 211, as discussed above.

In contrast, the embodiment 4 of the present invention equipped with a display-mode switching function described above can continuously offer video data, thus enhancing convenience to users.

Figure 13:
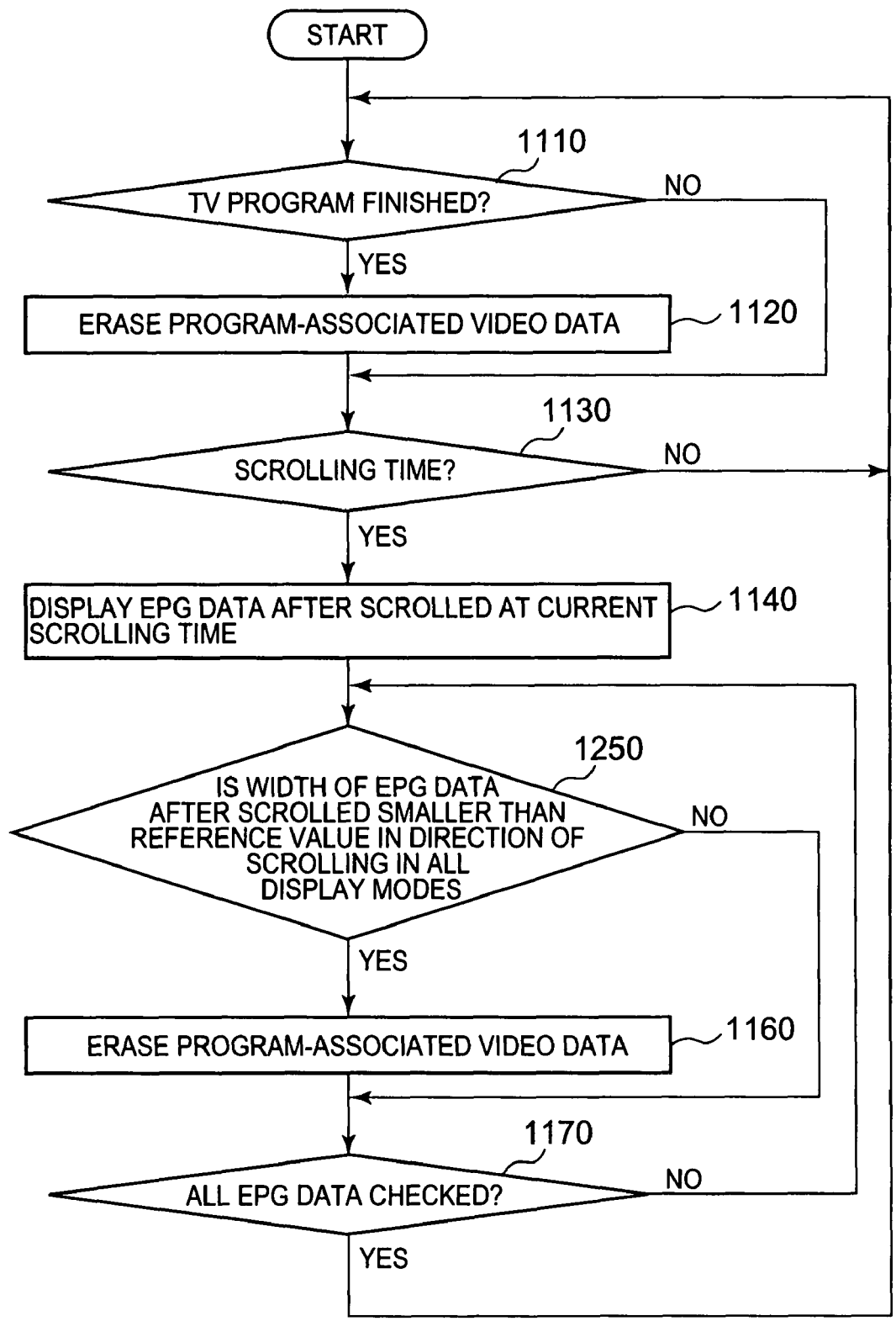
FIG. 13 shows a flow chart of another scrolling procedure executed by the digital broadcast receiving apparatus according to the present invention.

FIG. 13 shows a flowchart for the CPU 208 in the digital broadcast receiving apparatus (FIG. 2) to execute the procedure in the embodiment 4 of the present invention.

Steps 1110 to 1140 in FIG. 13 execute the same procedures as the counterparts of FIG. 10 and hence the explanation thereof is omitted.

In step 1250, the CPU 208 accesses the flash memory 211 that stores EPG data to determine whether the width (the number of dots) of EPG data containing video data in the vertical direction (height) in EPG is smaller than a reference value at the time of scrolling for all of the display modes, for example, the 6- and 3-hour modes shown in FIGS. 4 and 5, respectively. If smaller than the reference value ("YES" in step 1250), the video data is erased from the flash memory 211 in step 1160.

Figure 14:
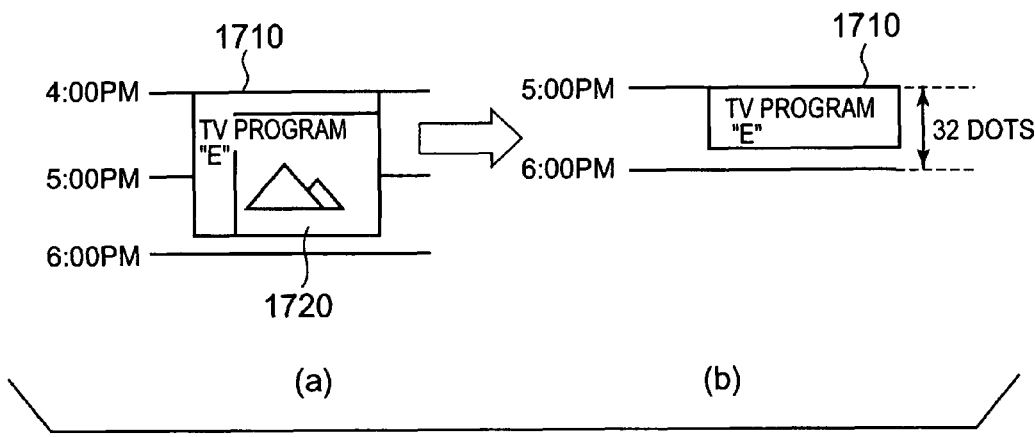
FIG. 14 illustrates how EPG data for a TV program displayed in the EPG is moved by scrolling.

Illustrated in FIG. 14 is an example of EPG data displayed in the 6-hour mode. In FIG. 14, a TV program "E" starts at 4:00 PM and finishes at 5:45 PM. The 6-hour mode with 192 dots in height offers 32 dots for displaying per hour.

At 4:59 PM, EPG data 1710 associated with the TV program "E" has 56 (=1.75 (hour)×32 (dots/hour)) dots in height that is more than 48 dots (the reference value). Video data 1720 contained in the EPG data 1710 is displayed, as shown in (a) of FIG. 14. The reference value of 48 dots is based on the fact that 16 and 32 dots are necessary to character and video data, respectively.

At 5:00 PM (the time of scrolling), as shown in (b) of FIG. 14, the TV program "E" has 45 minutes remained, with 24 (=0.75 (hour)×32 (dots/hour)) dots in height that is smaller than 48 dots (the reference value). The video data 1720 is not displayed anymore at this moment in the embodiment 3 of the present invention.

Figure 15:
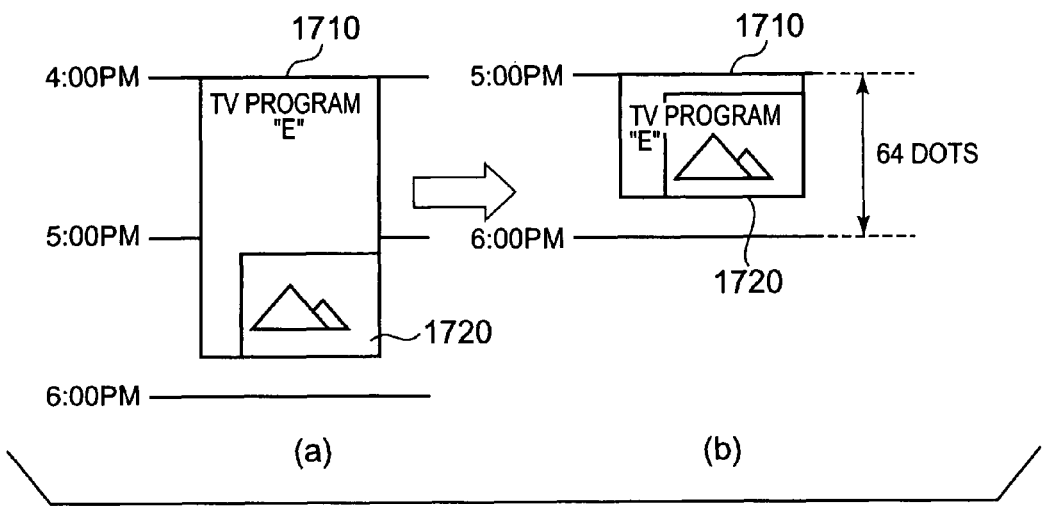
FIG. 15 also illustrates how EPG data for a TV program displayed in the EPG is moved by scrolling.

In the embodiment 4 of the present invention, it is determined in step 1250 whether the width (the number of dots) of the EPG data 1710 containing the video data 1720 in the vertical direction (height) in EPG is smaller than a reference value at the time of scrolling (5:00 PM) in all of the display modes, for example, the 6-hour mode shown in FIG. 14 and also the 3-hour mode shown in FIG. 15. Illustrated in FIG. 15 is the same EPG data 1710 containing the video data 1720 displayed in the 3-hour mode.

In (a) of FIG. 15, the EPG data 1710 is displayed with the video data 1720 for the TV program "E" at 4:00 PM in the 3-hour mode with 192 dots for 3 hours. Then at 5:00 PM (the time of scrolling), as shown in (b) of FIG. 15, the TV program "E" has 45 minutes remained, with 48 (=0.75 (hour)×64 (dots/hour)) dots in height equal to the reference value of 48 dots. Thus, the video data 1720 is still displayed at 5:00 PM.

According to the embodiment 4 of the present invention, if NO in step 1250, the video data 1720 is not erased from the flash memory 211, even though the 6-hour mode is selected.

When the display mode is switched from the 6-hour mode to the 3-hour mode via the remote controller I/F 216, the video data 1720 can be displayed at 5:00 PM.

As disclosed above, the embodiment 4 of the present invention offers a plurality of display modes, such as, the 6-hour mode with 192 dots in height shown in FIG. 4 (which may be a regular display mode) and the 3-hour mode with 192 dots in height shown in FIG. 5 (which may be another user-selectable display mode).

When it is the time of scrolling while EPG data is being displayed with the associated video data in the 6-hour mode and the width (the number of dots) in height of EPG data for a TV program is smaller than a reference value, it is determined whether the video data can be displayed in the 3-hour mode with the width (the number of dots) in height of EPG data for the TV program is equal to or more than the reference value. And, if determination is affirmative, the video data is not erased from the flash memory 211 at the time of scrolling. On the contrary, if the determination is negative, the video data is erased from the flash memory 211 at the time of scrolling.

The embodiment 4 offers a plurality of display modes. However, how many of the display modes are available or selectable to users (user-selectable) depends on where users live, difference in services by local TV stations, etc. Thus, the display modes subjected to the determination in the embodiment 4 are user-selectable display modes.

Accordingly, in addition to the same advantages as the embodiment 3, the embodiment 4 protects video data from being erased from the flash memory 211, if at least there is one display mode that can offer a display of the video data at the time of scrolling, which enhances convenience to users, which otherwise causes that the video data cannot be displayed at the time of scrolling even though there is an enough number of dots in height for displaying the video data when the display mode is switched at the time of scrolling.

In the above, the embodiments 3 and 4 of the present invention are disclosed as being executed while EPG data is being displayed. Not only that, the embodiments 3 and 4 can be executed as long as EPG data is being received even if the EPG data is not displayed.

In other words, according to the embodiments 1 and 2 of the present invention, the procedure shown in FIG. 9 starts while EPG data is being displayed and when time elapses from, for example, 59 minutes to 00 minutes (scrolling being occurred every hour). On the contrary, the procedure shown in FIG. 13 can be continuously executed irrespective of whether EPG data is being displayed, in the embodiment 4 of the present invention, which allows lower storage capacity to the flash memory 211 even if the number of TV programs increases or the amount of EPG data increases whereas the number of TV programs does not increase.

The embodiments 3 and 4 are made based on the embodiments 1 and 2 of the present invention, with video data having the size of an integer multiple (2 or larger) of character data. Not only that, the size of video data may be other than an integer multiple of character data, or a fixed value irrespective of the size of character data, for example, 30 or 40 dots in the vertical (height) direction to 16×16 dots of character data, in the present invention.

The size of character data employed in the embodiments 1 to 4 of the present invention is 16×16 dots, as disclosed above. Not only that, other sizes, for example, 15×15, 18×18, or 20×20 may be employed in the present invention.

Video data employed in the embodiments 1 to 4 of the present invention is still image data. Not only that, other forms of video data, such as, moving image data or a combination of still and moving image data may be employed in the present invention.

Moreover, the embodiments 1 to 4 of the present invention employ the digital broadcast receiving apparatus shown in FIG. 2 which is hardware. The digital broadcast receiving function described with respect to FIG. 2 and the other figures can, however, be achieved with software in the present invention.

As disclosed above in detail, according to the present invention, video data, that is contained EPG data and associated with each TV program to be aired or now on air, is displayed in an EPG, with the size in the vertical (height) or horizontal (width) direction as an integer multiple of character data of the EPG data so that a user can correctly and quickly know the contents of the TV program.

Moreover, according to the present invention, when the EPG is scrolled, video data is erased from a memory that stores EPG data if EPG data associated with the video data has a smaller size than a reference value in a scrolling direction, thus the memory enjoys lower storage capacity.

What is claimed is:

1. A digital broadcast receiving apparatus comprising:
   a receiver to receive electronic program guide (EPG) data containing video data and character data associated with TV programs;
   a memory to temporary store the EPG data received by the receiver; and
   a display controller to control displaying of an EPG with the EPG data by adjusting a size of the video data at least in either a first direction of height or width in the EPG or a second direction in which a time axis lies, the second direction intersecting the first direction, as an integer multiple of a size of the character data, for each TV program, based on the EPG data stored in the memory, the EPG having a time axis in the second direction that intersects the first direction, the data associated with the TV programs being aligned in the first direction, a length of each data associated with respective TV programs in the second direction depending on the duration of the respective TV programs.

2. The digital broadcast receiving apparatus according to claim 1, wherein the display controller controls displaying of the EPG, for each TV program, such that the video data is displayed by adjusting the size of the video data at least in either the first or second direction in the EPG as the integer multiple of the size of the character data based on the EPG data stored in the memory when duration of each TV program is equal to or longer than a predetermined time whereas the video data is not displayed when the duration is shorter than the predetermined time.

3. A digital broadcast receiving apparatus comprising:
   a receiver to receive electronic program guide (EPG) data containing character data and optionally video data associated with TV programs;
   a memory to temporary store the EPG data received by the receiver; and
   a display controller to control displaying of an EPG with the EPG data such that, based on the EPG data stored in the memory, the display controller determines, per TV program, whether the video data is contained in the EPG data in addition to the character data and controls the EPG displaying so that the character data is only displayed when it is determined that the video data is not contained in the EPG data whereas, when it is determined that the video data is contained in the EPG data, the display controller determines whether a specific size of a video-data displaying zone remains in an EPG-data displaying area in the EPG for each TV program after displaying the character data in the EPG-data displaying area per TV program and controls the EPG displaying so that the character data is only displayed when it is determined that the video-data displaying zone does not remain whereas, when it is determined that the video-data displaying zone remains, the display controller controls the EPG displaying so that the video data is displayed in the video-data displaying zone, in addition to displaying the character data in the EPG-data displaying area, the EPG having a time axis in a first direction of height or width in the EPG, the data associated with TV programs being aligned in a second direction that goes across the first direction, a length of each data associated with respective TV programs in the first direction depending on duration of the respective TV programs.

4. The digital broadcast receiving apparatus according to claim 3, wherein, when it is determined that the video data is contained in the EPG data for each TV program, the display controller further determines whether a specific size of a video-data displaying zone remains in the EPG-data displaying area after displaying one line of a TV program title in EPG-data displaying area per TV program and controls the EPG displaying so that the TV program title and other associated character data are displayed in the EPG-data displaying area per TV program when it is determined that the video-data displaying zone does not remain whereas, when it is determined that the video-data displaying zone remains, the display controller controls the EPG displaying so that the video data is displayed in the video-data displaying zone in addition to displaying the TV program title in the EPG-data displaying area.

5. The digital broadcast receiving apparatus according to claim 3, wherein the display controller controls the EPG displaying to scroll the EPG at a fixed scrolling time interval based on the EPG data stored in the memory, and while scrolling, the display controller determines whether a displaying width in the EPG in a direction of scrolling is smaller than a reference value per TV program and the display controller erases the video data from the memory for a specific TV program or specific TV programs when it is determined that the displaying width in the EPG in the direction of scrolling is smaller than the reference value for the specific TV program or TV programs.

6. The digital broadcast receiving apparatus according to claim 3, wherein the display controller controls the EPG displaying to scroll the EPG on the screen at a fixed scrolling time interval based on the EPG data stored in the memory and to display the EPG data in the scrolled EPG in a user-selected display mode among a plurality of user-selectable display modes different in displaying time, and while scrolling, the display controller determines whether a displaying width in the EPG in a direction of scrolling is smaller than a reference value per TV program in all of the display user-selectable modes and erases the video data from the memory for a specific TV program or specific TV programs when it is determined that the displaying width in the EPG in the direction of scrolling is smaller than the reference value for the specific TV program or TV programs in all of the user-selectable display modes.

7. A method of displaying electronic program guide (EPG) data on a screen, the EPG data containing character data and optionally video data associated with TV programs, comprising the steps of:

receiving the EPG data and temporary storing the EPG data in a memory;

determining whether the EPG data contains the video data in addition to the character data for each TV program based on the EPG data stored in the memory;

displaying an EPG with only the character data on the screen for each TV program when it is determined that the EPG data does not contain the video data, the EPG having a time axis in a first direction of height or width in the EPG, the data associated with the TV programs being aligned in a second direction that goes across the first direction, a length of each data associated with respective TV programs in the first direction depending on duration of the respective TV programs;

when it is determined that the EPG data contains the video data, determining whether a specific size of a video-data displaying zone remains in an EPG-data displaying area in the EPG for each TV program after displaying the character data in the EPG-data displaying area per TV program;

displaying only the character data in the EPG when it is determined that the video-data displaying zone does not remain; and displaying the video data in the video-data displaying zone in addition to displaying the character data in the EPG-data displaying area when it is determined that the video-data displaying zone remains.

8. The method according to claim 7 further comprising the steps of:

scrolling the EPG on the screen at a fixed scrolling time interval based on the EPG data stored in the memory; and while scrolling, determining whether a displaying width in the EPG in a direction of scrolling is smaller than a reference value per TV program and erasing the video data from the memory for a specific TV program or specific TV programs when it is determined that the displaying width in the EPG in the direction of scrolling is smaller than the reference value for the specific TV program or TV programs.

9. The method according to claim 8, wherein the scrolling step further includes the step of scrolling the EPG on the screen at the fixed scrolling time interval and displaying the EPG data in the scrolled EPG in a user-selected display mode among a plurality user-selectable display modes different in displaying time based on the EPG data stored in the memory; and the determining step further includes the step of determining whether the displaying width in the EPG in the direction of scrolling is smaller than the reference value per TV program in all of the user-selectable display modes and erasing the video data from the memory for a specific TV program or specific TV programs when it is determined that the displaying width in the EPG in the direction of scrolling is smaller than the reference value for the specific TV program or TV programs in all of the user-selectable display modes.

* * * * *